Feb. 16, 1965
R. E. DIETERICH
3,169,805
CHUCK AND HANDLE FOR MANUAL INSTALLATION
OF SELF-DRILLING EXPANSION SHELLS
Filed Oct. 18, 1962
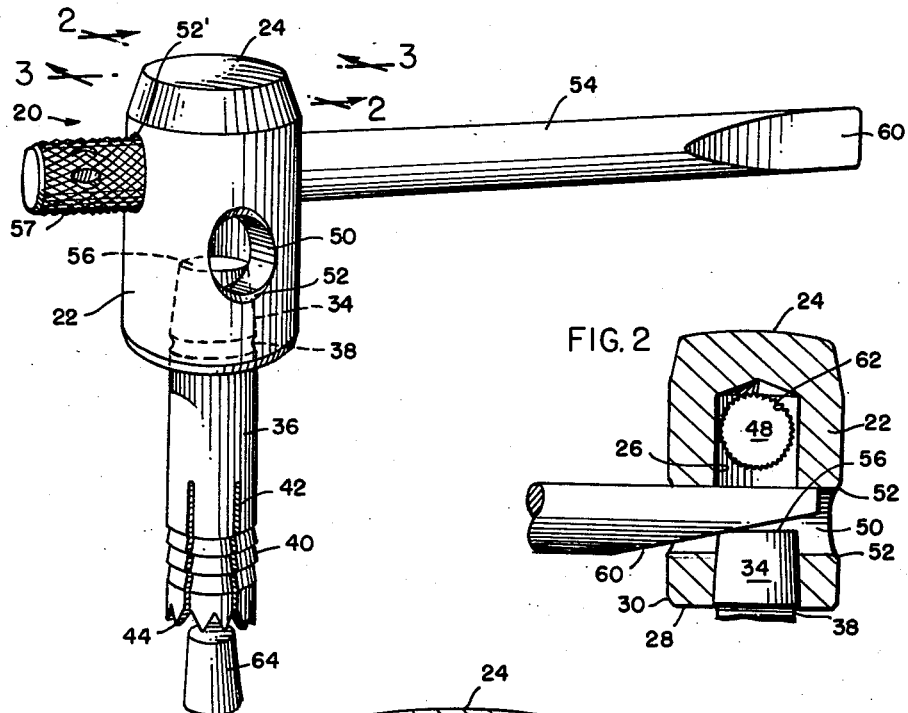
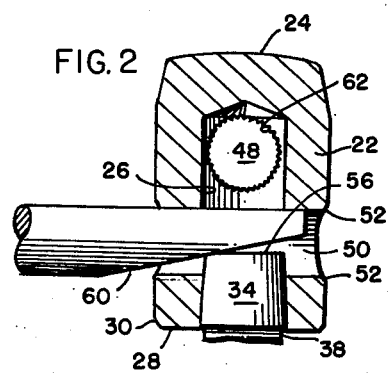
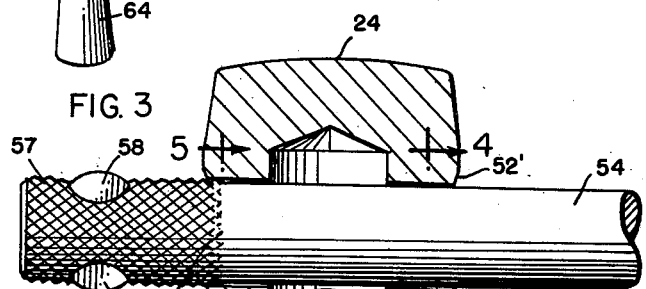
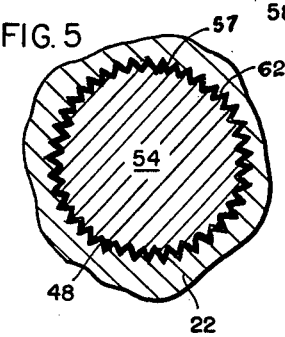
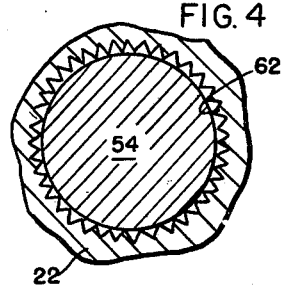
INVENTOR:
RICHARD E. DIETERICH
BY
Silverman, Mullin, Cass & Kaufman
ATT YS

United States Patent Office 3,169,805
Patented Feb. 16, 1965

3,169,805
CHUCK AND HANDLE FOR MANUAL INSTALLATION OF SELF-DRILLING EXPANSION SHELLS
Richard E. Dieterich, Michigan City, Ind., assignor to Phillips Drill Company, Michigan City, Ind., a corporation of Illinois
Filed Oct. 18, 1962, Ser. No. 231,534
1 Claim. (Cl. 306—33)

This invention relates to a chuck and handle for manually installing self-drilling expansion shells.

The shells which are intended to be installed through the use of the chuck and handle of the invention are elongate cylindrical members each having hardened teeth formed at one axial end thereof, and a tapered frusto-conical formation at the opposite end thereof. The cylindrical members are formed of steel and are hollow throughout their centers axially, and the toothed end has axially extending external fracture grooves cut in the wall thereof commencing at the teeth and extending part way along the length. These fracture grooves are circumferentially arranged about the cylindrical member, which is called a shell hereinafter, so as to enable the toothed end uniformly to split and spread when the shell is installed.

The frusto-conical end of the shell is separated from the remainder of the shell by an annular fracture groove to enable the end to be broken off by a lateral strain. The bore of the shell is threaded to receive a bolt of some standard size.

Shells of the construction described and others of a similar nature have been used for many years past. The frusto-conical end is wedgingly engaged in a complementary female socket provided in a chuck which in turn usually is mounted in a percussive hammer, either mechanically operated or electrically driven. More recently such shells have been installed in a small chuck or tool holder and a handle is removably secured to the tool holder enabling the tool holder or chuck to be held in the hand and rotated while hammer blows are applied to the end thereof.

The shells are for installation in concrete, masonry, brick and stone; to hang sprinkler systems, for mounting machinery and other apparatus, and for securing beams, pipe and the like. The shell is first driven directly into the concrete, for example, by repeated hammer blows while simultaneously turning the chuck back and borth axially to permit the teeth to cut a smooth hole. The cuttings and debris pass up the bore of the shell, through a hollow passageway provided in the chuck and out of a transverse passageway also provided in the chuck. The chuck is turned back and forth as mentioned above by means of some form of handle which engages in another transverse hole located further away from the shell.

When the shell has drilled its own hole to a depth approximately at a point where the annular fractured groove is flush with the surface of the concrete or other material, the shell is removed, still in the chuck and the hole is cleaned out. A hardened steel conical plug is inserted into the toothed end, and the shell returned to its self-drilled hole and hammered home by way of the chuck. The tapered plug splits the toothed end into segments along the grooves and these segments bite into the walls of the hole at the bottom thereof, thereby expanding the innermost end of the shell permanently in the hole. The chuck is then given a sharp lateral movement and the frusto-conical end that is engaged in the socket of the chuck breaks off at the annular fracture line, leaving the shell with its threaded entrance substantially flush with the surface of the masonry or concrete. The broken end now retained in the chuck is forced out by a suitable instrument, such as, for example, a rod having a flattened tapered side inserted into the transverse passageway previously mentioned which is provided for egress of debris in cutting. Thereafter the chuck is ready for the next shell.

The chuck and handle for manual installation of self-drilling expansion shells which has been known heretofore as especially adapted for the use of installing smaller sizes of shells, say, one-half inch in diameter or less. Such construction consisted of a cylindrical chuck body having a tapered socket at one end, and a vertical hollow bore but with an upper blind end so that the head of the chuck opposite the socket is solid to enable the application of hammer blows thereto. Intersecting the tapered socket is the transverse passageway used to enable discharge of the debris and cuttings and also used to enable the ejection of the broken off shell end. Somewhat further axially from the debris and shell-end ejection passageway is still another passageway usually at right angle to the previous one, which is adapted to be engaged by the handle.

In the said previous structure, the handle was a straight rod member having stop means provided on one end thereof to prevent the handle from passing completely through its passageway and having a flattened taper at the opposite end. One entrance of the transverse handle passageway was provided with seating means for the stop means so that the handle could be firmly held in the tool holder while the tool holder or chuck was being rotated during the application of hammer blows. After the shell has been installed and the end broken off, the handle is pulled out of its transverse passageway and the tapered end inserted into the debris discharge passageway and the shell end forced out.

In the use of the known chuck and handle for manual installation of self-drilling expansion shells, some difficulties have occurred which are alleviated by the invention herein.

One of these difficulties is that the handle has not been firmly gripped in the chuck resulting in a lack of stable support of the chuck during the installation. Another difficulty has been that the stop means on the handle was required to seat in certain depressions or formations provided in the chuck to get the best engagement of the handle with the chuck, but as stated, even this was not fully satisfactory. One was therefor required to insert the handle from only one side of the transverse opening unless similar formations were also provided in the opposite entrance of the transverse passageway which would give rise to additional expense.

The alleviation of these difficulties and the simplification of the structure comprise the principal objects of the invention.

Other objects of the invention are to provide a structure in which the handle may be inserted into the chuck into the transverse passageway thereof from either end of the passageway and by a light tap firmly locked into the transverse passageway for a firm and stable grip. Likewise such an object contemplates that a tap on the opposite end of the handle releases it from the transverse passageway so that it is readily used for ejecting the broken off end of a shell. Economy and ease of fabrication are also achieved.

Other objects and advantages will appear to those skilled in the art as a detailed explanation of the invention is set forth hereinafter in connection with which a preferred embodiment is illustrated in the drawing, from an examination of which one may readily understand and appreciate the invention in all of its aspects.

In the drawing:

FIG. 1 is a perspective view showing a chuck and handle arranged for driving a shell and the same being constructed in accordance with the invention.

FIG. 2 is a median sectional view through the chuck of FIG. 1 taken generally on a vertical plane defined by the line 2—2 and in the direction indicated, but showing the tapered end of the handle inserted into the debris discharge passageway for ejecting a broken off shell end.

FIG. 3 is a median sectional view through the chuck of FIG. 1 taken generally along the line 3—3 and in the direction indicated.

FIGS. 4 and 5 are fragmentary sectional views taken generally along the lines 4—4 and 5—5 respectively of FIG. 3.

The invention is characterized by the provision in a chuck and handle of the character described, of a handle which has a knurled or otherwise deformed end providing a rough gripping surface adapted to engage in an interference fit with the interior of the upper transverse passageway of the chuck so that it may be driven into engagement with the passageway by a light blow and as readily removed therefrom by a blow carrying the handle in the opposite direction. In the structure of the invention the handle is related to the diameter of the transverse passageway so that a major portion of the handle freely and readily slides through the transverse passageway but the knurling or roughening of the end of the handle is such as to produce protrusions or a roughened area upset to a diameter slightly larger than that of the handle and slightly larger than the diameter of the transverse passageway.

Additional improvements to the structure characterized as above may be provided by having a stop formation in the knurled or rough portion to prevent possible driving of the roughened or knurled end too far into the transverse passageway, and/or by having the passageway scored or likewise roughened to provide a plurality of grooves adapted to engage with the roughened or knurled portion frictionally to lock the handle in place.

Referring now to FIG. 1 especially, there is illustrated a structure which will be designated generally by the character 20 and comprising a chuck and handle constructed in accordance with the invention. The chuck 22, is in the form of a cylindrical elongate member of steel, suitably heat treated, either entirely, or selectively to provide any desirable toughness or hardness characteristic. For example, the upper or head end 24, which is adapted to be struck by hammer, may be softer than the remainder to prevent shock and possible cracking, this being a well known technique, and not important to the invention. The upper end 24, is solid or imperforate, and may be somewhat tapered or dome shaped to compensate for likelihood of spreading due to repeated hammering.

A vertical axial passageway 26 is bored up center of the chuck 22 terminating short of the upper end 24 to provide sufficient strength to constitute the upper end 24 as an impact head. The bottom end 28 is planar and the edges may be chamfered as at 30 to avoid sharp corners. The passageway 26, hereinafter called the axial bore, has its bottom end tapered to form a socket at 32 complementarily to receive therein the frusto-conical end 34 of a self-drilling expansion shell 36, previously described hereinabove. The annular fracture groove of the shell can be seen at 38 in FIGS. 1 and 2, just below the frusto-conical end 34. The body of the shell 36 has the annular broaching ridges 40 which assist during the drilling, and the axially extending fracture grooves indicated at 42 which terminate at the toothed end 44. The plug 64 used to expand the shell is shown in FIG. 1 in exploded relationship.

The chuck 22 has two transverse passageways 48 and 50, which are substantially at right angle to one another and which intersect the axial bore 26. The lower passageway 50, which is the debris discharge passage is required to intersect said axial bore 26, but the upper transverse passageway need not do so. The entrances of these passageways may be slightly counter-sunk as shown at 52 and 52' to lead the insertion of the handle 54 therein. The dimensions of the axial bore 26, the tapered throat at socket portion 32, and the dimensional relationship of the same with respect to the transverse passageway 50 are such that when a shell 36 is tightly engaged in the socket portion 32, the extreme end 56 of the frusto-conical portion 34 protrudes into the lower confines of the passageway 50 and intersects the same.

The structure thus far described is known. The difference between the invention herein in the known structure lies in the construction of the handle 54. An additional phase of novelty relates to a construction of the transverse passageway 48.

The handle 54 as in the prior structure is in the form of a rod member of uniform diameter having a flat tapered portion 60 at one end thereof. The relationship of the rod member 54 to the transverse passageway 48 is such that the body of the rod 54, that is the smooth portion as seen in the drawing, freely and readily slides through the transverse passageway 48. Likewise, the body of the handle 54 freely slides through the transverse passageway 50 and if inserted therein with the tapered portion 60 first may function to reject a broken off shell end as shown in FIG. 2.

In accordance with the invention, the rod member 54 is knurled at the end opposite the flat tapered portion 60 as shown at 57. This knurling is accomplished through the use of any conventional knurling tool, there being several different varieties but the most common being of a type which provides diamond shaped points upset on the surface of the handle end. The tips of these points, as well as the tips of any knurled or roughened formations worked into the end of a handle in effect increase the diameter of the handle 54 at the knurled end 57 and usually there will be a gradual increase from the smooth part of the handle to the fully knurled part. This graduated portion provides an annular area at 59 of very light knurling increasing to the left as shown in FIG. 3, so that if the handle 54 is inserted into the passageway 48 from the left hand end thereof as viewed in FIG. 3 and pushed into the passageway, there will be an interference fit between the knurling 57 and the passageway 48. The amount of engagement, that is the locking effect of the interference fit is controlled in addition to the diameter increase, by the force applied in driving the handle 54 to the right, as viewed in FIG. 3, into the passageway 48. All that is necessary in most cases is to insert the handle manually and then hold the chuck 22 and handle in one hand and with the knurled end 57 pointing downward, to sharply bring the assembly against the hard surface with a sharp blow. To remove the handle one merely reverses the direction of the handle so that the tapered end 60 points downward and brings the assembly against the hard surface with another sharp blow.

It has been found that the engagement occasioned by the use of the knurled end 57 is such as firmly to grip the handle into the passageway and thereby enable the user to hold the chuck steady and firm while installing the shell 36 and while breaking off the frusto-conical end 34. As the handle is used over a period of time, gradually the passageway and/or knurling may be worn so that the knurled portion extends deeper and deeper into the passageway, but it will be apparent that there will always be a fresh and sharp-pointed area available for making the lock fit. If desired, the end 57 may be divided with a small pinch on one or both sides thereof as shown in 58. These pinches serving to extrude some material to form stop means to limit the extent to which the knurled end 57 may be driven into the passageway 48.

The passageway 48 itself may be advantageously provided with scoring or grooves as shown at 62 more readily to cause the interference shown in FIG. 5 and to more positively lock the handle in place. These are not completely necessary however. Such scoring 62 may be achieved by driving a grooved or toothed broach through the passageway 48. If the spacing of the score lines is chosen to align with rows of points of the knurling, practically mating engagement occurs as shown in FIG. 5.

It will be obvious that the handle 54 may be inserted either from one end or the other of the passageway, since there is no dependence upon any seating arrangement to lock the handle in place. Likewise the chuck is easier to fabricate.

In use, the chuck 22 and handle 54 operate as the known structure. The shell 36 is inserted into the socket portion 32 of the axial bore 26 and the handle 54 is held in one hand by the user with the toothed end 44 engaged the masonry or concrete. With the hammer held in his other hand, the user lightly taps the impact head 24 of the chuck and commences to swing the handle back and forth about the axis of the bore 26. The shell 36 cuts its own hole, the debris and cuttings coming up the bore 26 and thence entering the transverse debris-discharge passageway 50, coming out of the ends thereof. After having penetrated to about the annular fracture groove 38, the chuck is lifted, pulling the shell 36 out with it and the resulting hole is cleaned. The tapered end plug 64 is then inserted into the toothed end 44 and the shell reinserted into its hole with the plug 64 at the bottom of the hole. The user drives the shell home by again hammering on the end 24 of the chuck 22 but this time without swinging the handle 54. The toothed end expands in the hole as explained. The user then strikes the side of the chuck 22 and the end 34 breaks off as shown in FIG. 2. The handle 54 is then withdrawn from the transverse passageway 48 as previously described, and the flattened taper end 60 is inserted facing downward, into the passageway 50 from either end thereof. The wedging force supplied by the flattened end 60 ejects the broken end 34, the handle 54 is replaced in its passageway 48 in the manner described, and the chuck and handle 20 are ready for use again.

It should be obvious that variations are capable of being made without departing from the spirit or scope of the invention as defined in the appended claim.

What it is desired to secure by Letters Patent of the United States is:

In a device of the character described, including a chuck body having a clear through transverse passageway with opposite entrances; an elongate handle in the form of a rod arranged to be engaged in the transverse passageway for rotating the chuck during use thereof, said handle having a uniform cylindrical body the major length thereof being of a diameter to permit free slidable movement through the passageway from either entrance thereof, and an enlarged knurled formation at one end of the handle the outside diameter of which is greater than the diameter of the body, and said knurled formation adapted to have a releasable interference fit at an entrance of the passageway, so as to enable the handle to be inserted into either entrance of the passageway while permitting releasable frictional engagement between the chuck and the handle preventing inadvertent sliding movement of the handle relative to the chuck during the use thereof.

References Cited by the Examiner
UNITED STATES PATENTS

| 1,714,708 | 5/29 | Winning. | |
| 2,147,343 | 2/39 | Hokanson | 306—30 X |
| 2,829,898 | 4/58 | Tilden | 279—19 |
| 2,896,212 | 7/59 | Werstein | 1—49.8 |
| 2,926,353 | 3/60 | Werstein | 279—19 |
| 3,028,167 | 4/62 | Werstein | 279—19 |

ROBERT C. RIORDON, *Primary Examiner.*